(12) United States Patent
Fales et al.

(10) Patent No.: US 10,796,067 B1
(45) Date of Patent: Oct. 6, 2020

(54) EDA CAA WITH LEARNING PHASE

(71) Applicant: Cadence Design Systems, Inc., San Jose, CA (US)

(72) Inventors: Jonathan R. Fales, Finksburg, MD (US); Frank E. Gennari, Campbell, CA (US); Jeffrey E. Nelson, Saratoga Springs, NY (US); Jeffrey Russell, Livingston, TX (US); Ya-Chieh Lai, Mountain View, CA (US); Jac Paul Condella, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/389,737

(22) Filed: Apr. 19, 2019

(51) Int. Cl.
*G06F 30/398* (2020.01)

(52) U.S. Cl.
CPC .................. *G06F 30/398* (2020.01)

(58) Field of Classification Search
USPC ........................................................ 716/102
See application file for complete search history.

(56) References Cited

U.S. PATENT DOCUMENTS

| | | | |
|---|---|---|---|
| 2004/0115541 A1* | 6/2004 | Yamaguchi | G03F 1/84 430/30 |
| 2006/0190222 A1* | 8/2006 | Allen | G06F 30/33 703/2 |
| 2006/0190223 A1* | 8/2006 | Allen | G06F 30/3323 703/2 |

* cited by examiner

*Primary Examiner* — Mohammed Alam
(74) *Attorney, Agent, or Firm* — Schwegman Lundberg & Woessner, P.A.

(57) ABSTRACT

Systems, methods, media, and other such embodiments described herein relate to critical area analysis (CAA) operations as part of electronic design automation (EDA). One embodiment involves accessing a circuit design having a first layer (which may be a composite layer), sampling the first layer, and performing an initial CAA using the sampled portions of the layer with a set of predetermined defect sizes. The initial CAA is used to automatically generate a model which can be used to accurately select input parameters (e.g., selected defect sizes) for a full analysis. A CAA characteristic is then calculated for the first layer using the input parameters. In various embodiments, different sampling percentages and criteria for selecting input parameters can be used to reduce the computing resources to compute a CAA characteristic, such as theta-bar, while limiting error to a threshold amount (e.g. less than one percent).

19 Claims, 15 Drawing Sheets

US 10,796,067 B1

EDA CAA WITH LEARNING PHASE

TECHNICAL FIELD

Embodiments described herein relate to electronic design automation (EDA), and to systems, methods, devices, and instructions for associated critical area analysis (CAA).

BACKGROUND

Electronic design automation (EDA) is a category of systems for assisting with the design of electronic systems and devices. Large integrated circuit designs are complex and are subject to random manufacturing defects during manufacturing. Critical area analysis (CAA) is an analysis of portions of a layout where a defect of a given size will cause a functional failure of a circuit.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein relate to EDA and to methods, computer readable media and associated instructions, and devices used for analyzing, testing, optimizing, and creating electronic circuits.

Particular embodiments include aspects of CAA as part of EDA operations for designing and fabricating a circuit. Various embodiments improve the operation of machines used to perform CAA by reducing the amount of time to analyze a circuit design using the machines. For increasingly complex circuit designs, CAA using a machine may take thousands of hours of compute time using previously known methods. Embodiments described herein can reduce CAA time on the same machine by significant amounts with limited degradation in accuracy. For example, some embodiments can see machine processing time reduced by more than 95% with less than 1% decrease in accuracy. Such improvements can be achieved using a preliminary learning phase to collect more CAA data than is typically collected, but only on a subset of the data. This is done in order to automatically analyze the preliminary results and create an accurate model of the subset data. From this analysis and modeling, the learning phase determines a set of inputs and thereby directs the final CAA in a more efficient, full analysis, while meeting accuracy targets. Some previous systems calculated critical area using Voronoi diagrams, but the embodiments described herein improve upon such methods, in systems where a discrete analysis of a compute intensive EDA continuous function associated with a circuit design whose sampled data is representative of the full data, to provide an efficient discrete analysis of data from a continuous function as part of analysis of a circuit design. By improving the performance of a machine performing CAA, a circuit design process can involve additional design revisions in less time, resulting in improved device yield, a faster overall design process, and other such benefits from improved performance of the machine. Additional specific details associated with embodiments of CAA with a learning phase are described in detail below.

Figure 1:
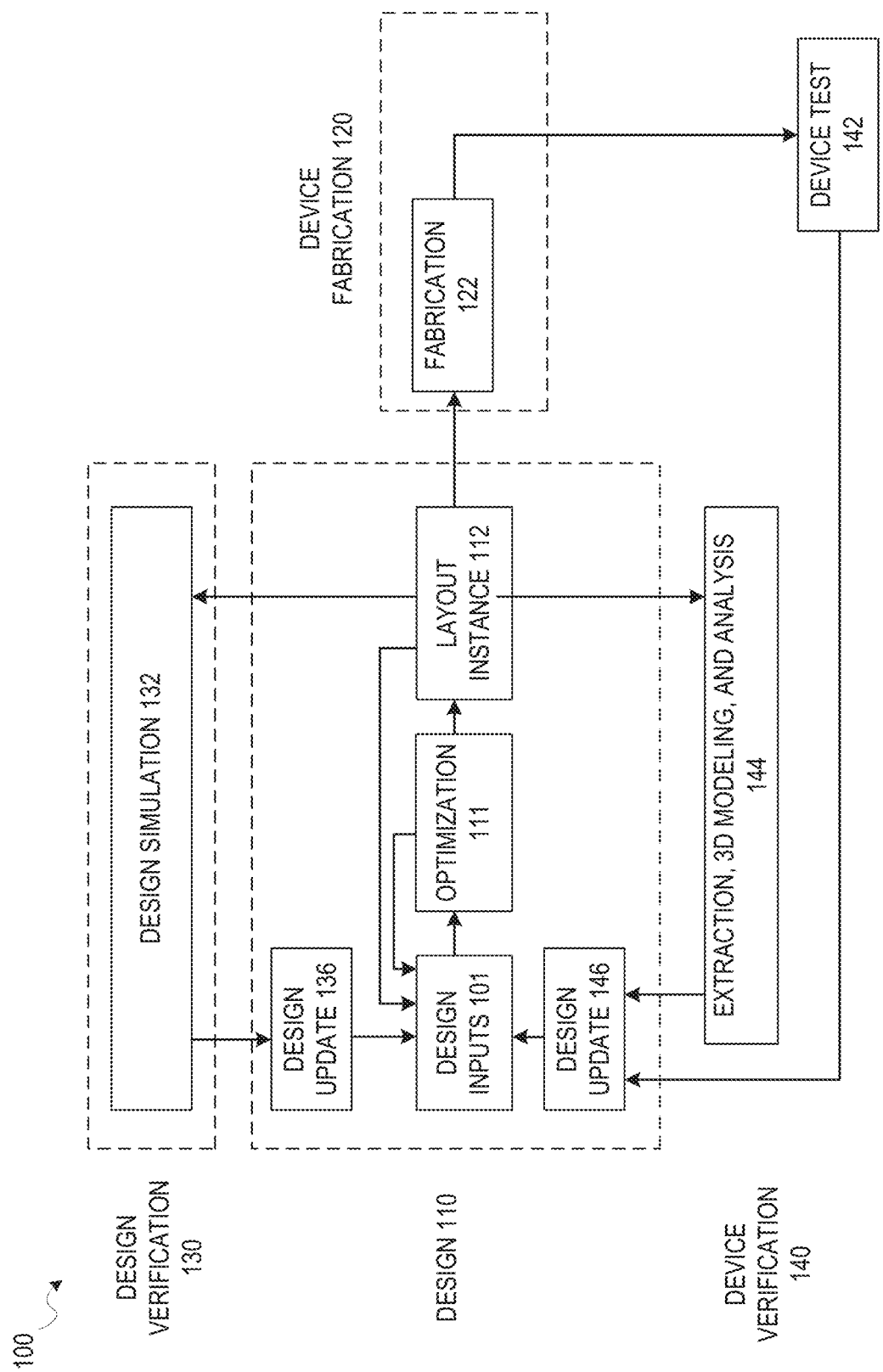
FIG. 1 is a diagram illustrating one possible design process flow, in accordance with various embodiments.

FIG. 1 is a diagram illustrating one possible design process flow for a circuit design. CAA is one aspect of a much larger design process, but the operations are such that CAA operations can take a significant amount of time within the overall flow. It will be apparent that other design flow operations may function using embodiments described, but a design flow 100 is described here for the purposes of illustration. Embodiments described herein are primarily related to CAA for determining defect rates expected in fabrication of a circuit design once a layout instance 112 is created but prior to a fabrication operation 122. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a circuit design are generated. The initial strategy, tactics, and context for the device to be created are also generated in the design input operation 101, depending on the particular design algorithm to be used. A testability analysis may be performed at any point following generation of the initial design. Full operations for CAA may be performed following generation of the initial design or at any place in the circuit design process flow described herein.

Updates to a design may be performed at any time to improve expected operation and yield of a circuit design. Certain embodiments of operations described herein for CAA can therefore involve iterations of the design input operation 101, an optimization operation 111, and layout instance 112 generation based on the results of CAA and design changes to improve CAA results.

After design inputs are used in the design input operation 101 to generate a circuit layout, and any optimization operations 111 are performed, a layout is generated as the layout instance 112. The layout describes the physical layout dimensions of the device that match the design inputs. This layout may then be used in the device fabrication operation 122 to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

Design updates 136 from the design simulation 132 operations, design updates 146 from the device test 142 or extraction, 3D modeling, and analysis 144 operations, or the design input operation 101 may occur after the initial layout instance 112 is generated, and can include CAA.

Figure 2:
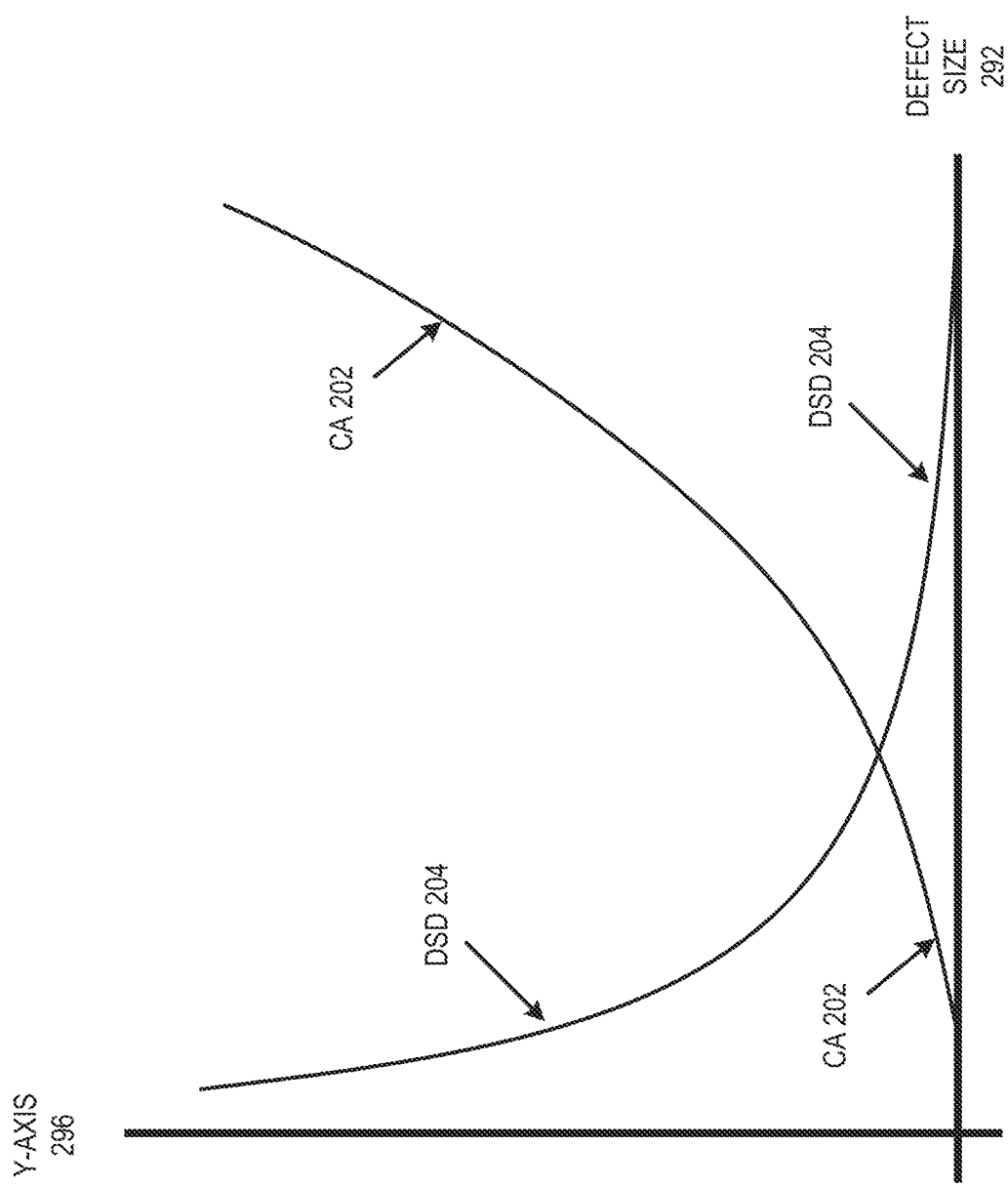
FIG. 2 illustrates aspects of CAA, in accordance with various embodiments.
Figure 3:
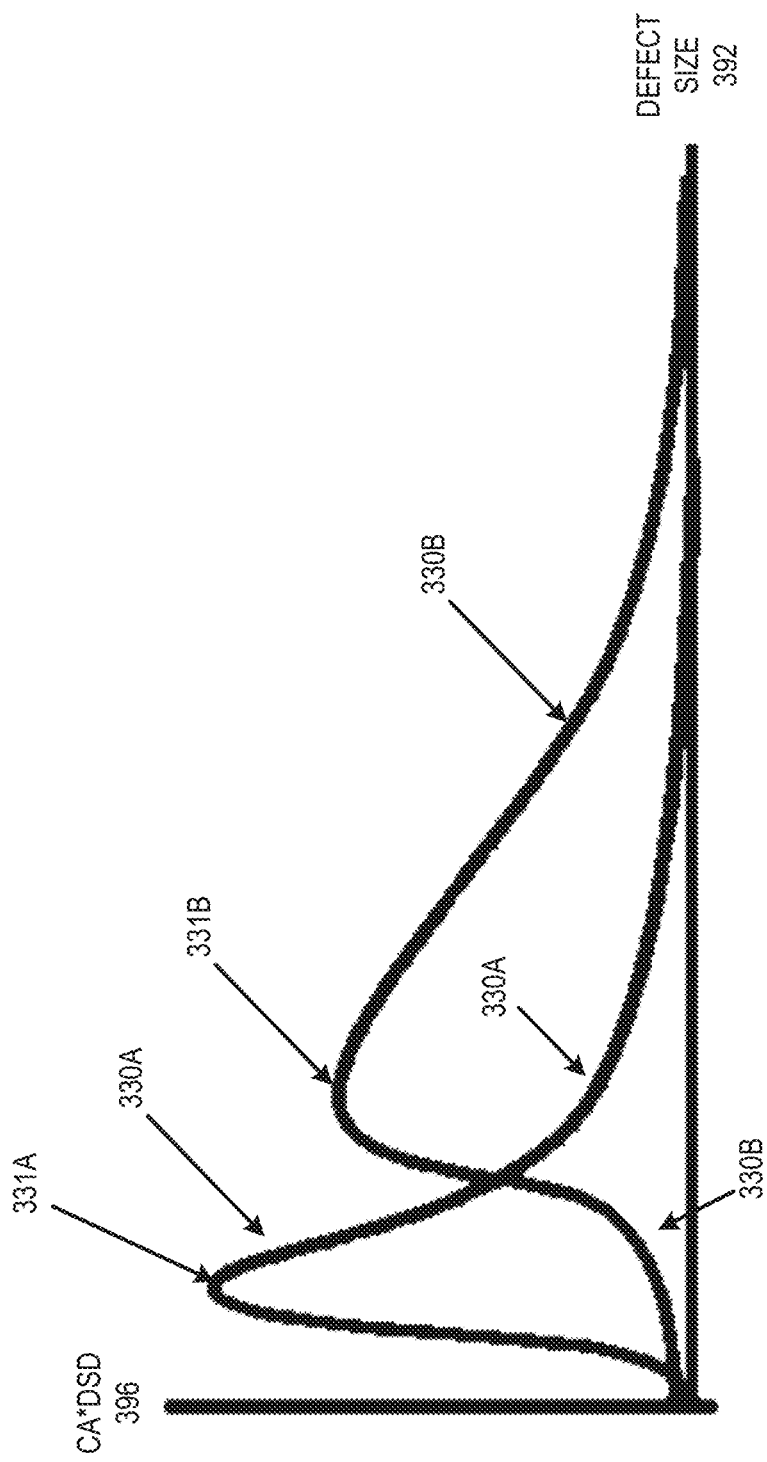
FIG. 3 illustrates aspects of CAA, in accordance with various embodiments.

FIGS. 2 and 3 illustrate aspects of CAA, in accordance with various embodiments. In particular, FIG. 2 shows a graph with y-axis 296 and x-axis for defect size 292. The y-axis 296 will have different values for a CA curve 202 and a defect density (DSD) curve 204. Each of these curves can be modeled and used in calculating a CAA metric theta-bar, which is given by:

$$\bar{\theta} = \frac{\int_{rmin}^{rmax} CA(x)DSD(x)dx}{Area}$$

In this equation, theta-bar is a metric associated with fabricated device defect rates, CA(x) is the critical area for a random defect of a given radius, and DSD is the number of defects per unit area in the circuit design. This theta-bar value may be calculated using a continuous method or estimated using a discrete method. R_max and r_min are the minimum and maximum defect size (e.g., defect radius) considered. When a continuous method is used, r_max can be infinity so long as the r_min is chosen appropriately so that the result is included in the area under the curve for CA multiplied by DSD. When a discrete method is used, the discrete sample points are selected to cover the CA*DSD result well, or the result will have excess error due to inadequate sampling around complex regions of the curve. Such a CA*DSD curve may be drastically different for different circuit designs, and so selection of measurement points for different circuit designs is important to accuracy of a calculation of theta-bar. FIG. 3 illustrates two different CA*DSD curves 330A and 330B in a graph with a y-axis having CA*DSD 396 values and an x-axis having defect size 392 values. Curve 330A has a maximum point 331A, and curve 330B has a maximum point 331B. Using a sampling rate needed at key points of the CA*DSD curve (e.g., inflection points and various minima/maxima, with certain step-function characteristics within the curve resulting from a defect of a certain size interacting with a design with certain features) across the entire range of defect sizes, however, causes a performance problem. However, generally lowering the sampling rate will cause excessive error rates due to the high-slope regions of the curves, as can be seen in FIG. 3. As illustrated, curves 330A and 330B represent curves for different layers of a circuit design and illustrate significantly different CAA results. Embodiments herein thus perform a learning phase to determine the CA and DSD curves, and the associated CA*DSD curve in order, to select the points for a discrete calculation in an efficient manner. The learning phase involves an intentional over-specification of the defect sizes and an automatic analysis of the preliminary data to automatically develop a model that is used to accurately select inputs (e.g. defect sizes) to a final analysis. This learning phase can identify analysis parameters used to focus on the key areas of the illustrated curves, which, as illustrated by curves 330A and 330B, may involve parameters which focus on different sampling rates for different defect sizes based on the inflection points or high-slope areas of the curve for a particular layer. For example, if a design has certain minimum widths for elements and spaces between elements, defects smaller than this minimum distance may have no impact on a circuit, whereas defects right at the minimum distance may cause a step-function like result in the CA and associated parameters, as the defects go from having no impact to impacting a large number of elements due to the defect size matching a distance value reflected in the design of the circuit. The sampling values or defect size selection parameters (e.g., selection of defect sizes used to target key areas of the CA*DSD curve) are then used to perform a full CAA with discrete points selected to reduce processing time by avoiding unnecessary discrete points while emphasizing discrete points where they reduce error to an acceptable rate (e.g., less than 1%, less than 2%, less than 0.5%, etc., for various systems). In some embodiments, particular error rates may be targeted by increasing or decreasing the discrete points or otherwise adjusting the analysis parameters based on expected impacts on error rates for the CAA parameters (e.g. theta-bar).

As is detailed further below, measuring a small of amount of sample data from a circuit design reliably predicts the parameters for the entire circuit and the circuit design CA*DSD curve. This is due to standard cells, routers, fill, and design rules tending to minimize the variation of the CA*DSD curve within the same layer of a design.

Figure 4:
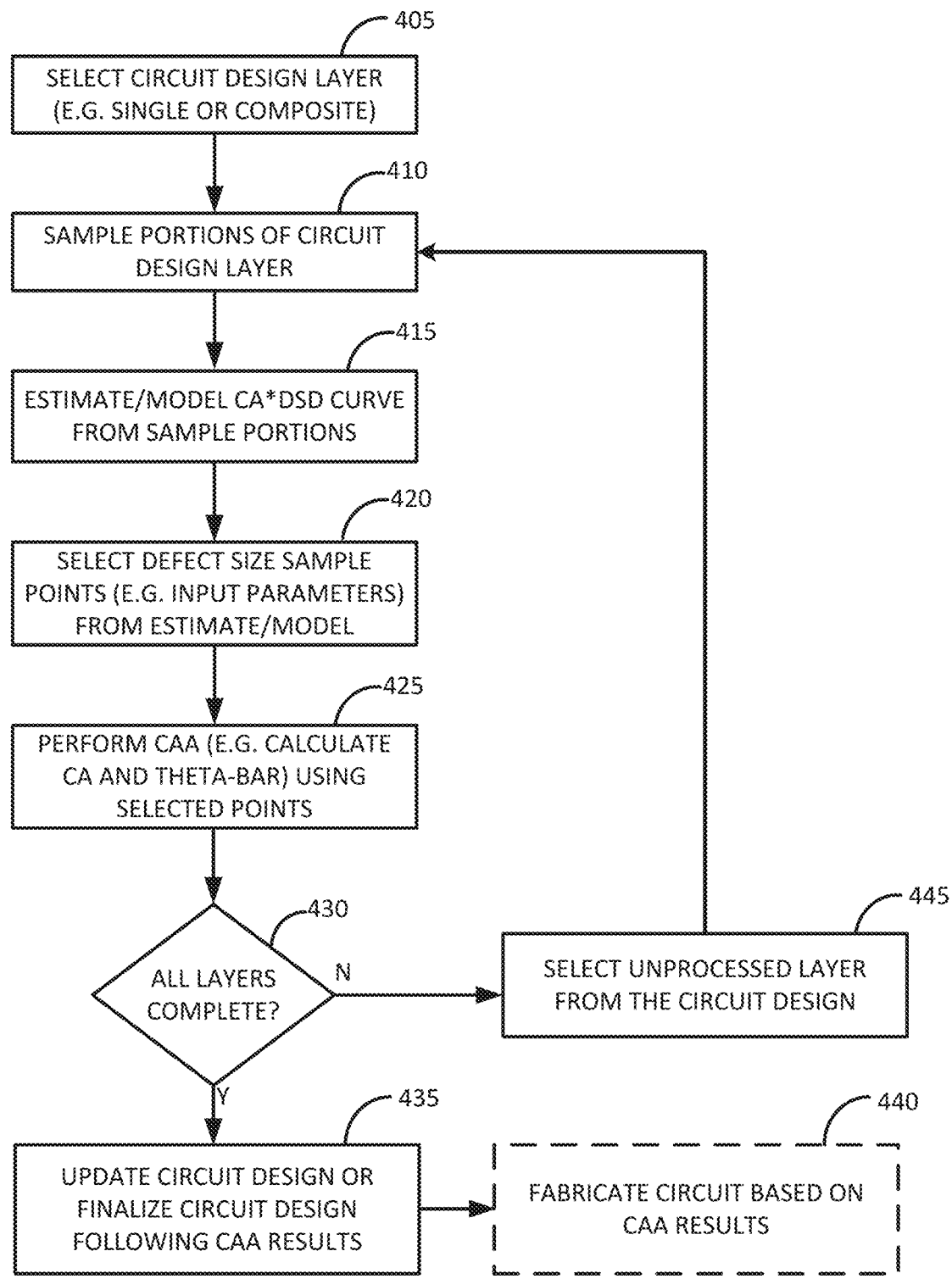
FIG. 4 illustrates a flowchart of EDA CAA with a learning phase, in accordance with various embodiments.

FIG. 4 illustrates a flowchart of EDA CAA with a learning phase, in accordance with various embodiments. The flowchart of FIG. 4 assumes design data for a circuit design having one or more layers, with sufficient detail in the design data to determine placement of the circuit elements in the circuit design. In operation 405, a layer is selected from the circuit design for CAA. In some embodiments, a circuit design that is to be analyzed has different layers which are analyzed separately. In some embodiments, some such separate layers can be represented as a composite layer and treated as a "layer" for the purposes of the operations described below. In either case, the circuit design layer (e.g. a single individual layer from the design or a composite layer) are analyzed according to the operations below. In operation 410, portions of the selected layer are sampled. This sampling allows a quicker estimate of a CA*DSD curve than a full analysis and enables efficiency in a later full analysis. In some embodiments, this sampling may involve random selections of areas within the layer (e.g., random squares selected from the full area of the layer). In other embodiments, the layer may be divided into a grid or other periodic segmentation, with small selections taken from each segment. For example, the area of a circuit design layer may be divided into a grid of squares, with a small square sampled from the center of each grid square to achieve a sampling of the selected layer. Depending on the accuracy targeted, the sample area may be less than 1% of the area of the circuit design layer, or may be any other larger sampling percentage. Some embodiments may use a sampling area around 1% of the circuit design layer area. Other embodiments may use a sampling area around 3% or 5% of the circuit design layer area.

After the sample portions of the circuit design layer are selected in operation 410, then in operation 415, these sample areas are used to determine a critical area for given defect sizes. This information from the sampled areas is then used to automatically create a model of the CA*DSD curve for the entire layer. As long as the sampled area is sufficiently large to be representative, but small enough to not use a significant amount of resources during this estimate phase, the benefit of the estimate significantly reduces the overall time for calculating an accurate (e.g., margin of error less than one percent) theta-bar. The model of the CA*DSD curve can be used to select inputs for a final CAA that focuses on key areas of the curve while avoiding redundant analysis in other areas of the curve. In some embodiments, an analysis or set of circuit design criteria may be used to confirm that a small sampling size is sufficient to represent the entire layer (e.g. that the layer conforms to certain standard circuit design criteria). A predetermined set of defect sizes are used for this analysis, as illustrated in table 1:

TABLE 1

| Defect Size | Layer 1 CA | Layer 2 CA | Layer 3 CA |
|---|---|---|---|
| 1 | 0 | 0 | 0 |
| 2 | 0 | 1.925 | 0 |
| 3 | 0 | 6.518 | 0 |
| 4 | 0 | 9.234 | 0 |
| 5 | 0 | 12.878 | 2.012 |
| 6 | 0 | 21.786 | 6.687 |
| 7 | 0 | 47.541 | 12.342 |
| 8 | 0.027 | 59.089 | 25.750 |
| 9 | 0.117 | 81.387 | 47.541 |
| 10 | 2.168 | 114.903 | 59.089 |
| 11 | 8.754 | 142.414 | 91.398 |
| 12 | 56.239 | 164.477 | 152.414 |
| 13 | 100.949 | 178.579 | 184.040 |
| 14 | 167.429 | 188.471 | 192.845 |
| 15 | 187.555 | 191.625 | 192.845 |
| 16 | 208.845 | 194.425 | 192.845 |
| 17 | 208.845 | 200.918 | 192.845 |

Table 1 includes critical area calculations for three layers of a circuit design at given defect sizes. The defect sizes are numbered to illustrate different calculations for different defect sizes and are not intended to illustrate relative defect sizes associated with the numbering. In some embodiments, the critical area calculations may be performed with defect sizes y selected using an inverse exponential scale as:

$$y = ae^{-bx} \quad (2)$$

where $$b = \ln(r\_maxp/r\_minp)/(nump-1) \quad (3)$$

and $$a = r\_minp/\text{exponent}(b) \quad (4)$$

and where nump is the number of defect sizes (e.g., seventeen defect sizes illustrated in table 1), and r_minp and r_maxp are the maximum and minimum defect sizes used for the initial prelude analysis of operation 415. One system, for example, may use r_minp=20 nanometers (nm), r_maxp=20 micrometers (um), and num=12, which would give the selected defect sizes, in um, as 0.020, 0.037, 0.070, 0.131, 0.246, 0.462, 0.865, 1.622, 3.039, 5.696, 10.673, 20.000. Another system may use, for example, r_minp=10 nm, r_maxp=4 um, and num=24 which gives the following defect sizes to calculate critical area with (in um): 0.010, 0.012, 0.016, 0.021, 0.028, 0.036, 0.047, 0.061, 0.080, 0.104, 0.135, 0.175, 0.227, 0.295, 0.383, 0.497, 0.645, 0.838, 1.087, 1.411, 1.830, 2.375, 3.082, 4.000. In various other embodiments, the distribution of defect sizes for initial CA calculations and an initial CA*DSD curve estimate can be based on another distribution other than one using the equation above. Additionally, the number of selected defects may be determined based on fabrication data, a standard set of applicable defect sizes, the details of the circuit design layer, or any other such selection method. Just as with the sampled area of the circuit design layer (e.g., a one percent, five percent, etc. sampling), the number of defect sizes can be any number selected to provide a reasonable estimate of the CA*DSD curve while not using an excessive amount of computing resources (e.g., fewer resources or fewer defect sizes than a full analysis). In addition to the type of the distribution used and the number of defect sizes used, to select the defect sizes for the preliminary CAA learning phase (operation 415), it is necessary to correctly set the minimum (first) and maximum (last) defect size. Where no prior information or experience exists, the process of generating Table 1 may be iterative in order to correctly set the minimum and maximum defect sizes for the preliminary CAA of the learning phase. In order to provide a reasonable estimate of the CA*DSD curve, the minimum defect size must result in 0 critical area, and the maximum defect size must make no further contribution to the critical area. For Layer 1 CA in Table 1, defect sizes 7 through 17 are sufficient. For Layer 3 CA in Table 1, defect sizes 4 through 15 are sufficient. For Layer 2 CA in Table 1, defect size 1 is sufficient for the minimum defect size, but there is no qualifying maximum defect size shown for this example. In this case, the selected defect size distribution does not cover the full range of defect sizes that impact the CA result and the results for this layer would be inaccurate without more iterations to determine the maximum defect size for Layer 2 CA. Therefore, the defect size distribution must cover the range of relevant data to accurately report the CA for the next step in the learning phase. Typically, this is accomplished with hundreds of defect sizes, and a minimum less than the minimum feature size in the data, and a maximum 1000 to 10000 times the minimum feature size in the data. For example, where previous systems may use over a hundred defect sizes for a full analysis with no optimization in order to have adequate resolution on high-slope sections of the CA*DSD curve, the prelude learning phase may use that number of defect sizes to provide details only for the initial estimate of a CA*DSD curve on a subset of the data. The full CAA, being informed by the preliminary CAA, is optimized to focus the selected defect sizes on the key areas of the CA*DSD curve, rather than spreading them out equally over the entire curve.

As a further part of the preliminary CA*DSD curve estimation of operation 415, once the critical areas for a layer are calculated using the selected defect sizes discussed above, the preliminary CA*DSD curve may be automatically analyzed and modeled to optimize the full CAA per layer. In general, an automated analysis of the preliminary CA*DSD curve determines the CA*DSD curve's characteristics such as its slope, inflection points, or whether it is linear or not; per range of defect sizes. The analysis then applies the appropriate mathematical models for the particular range of defect sizes in order to ultimately direct an efficient, full CAA. The mathematical model's coefficients are calculated from the preliminary CA*DSD curve's data points, and numerical methods are applied to determine the best fit for the particular data range. In one embodiment, the automated analysis identifies two distinct regions in the preliminary CA*DSD curve, separated by a maximum point (e.g., point 331A or point 331B of FIG. 3). A front side portion of the curve (e.g., where the defect size is less than the defect size associated with the maximum point) is identified and modeled from the CA values as a second order polynomial with the y=0 intercept providing the optimized value for r_min. The back side portion of the curve (e.g., where the defect size is greater than the defect size associated with the maximum point) is recognized and modeled as an inverse exponential which provides the optimized value for r_max, set where CA*DSD is a threshold fraction of the maximum point value (e.g., where the CA*DSD value at r_max is less than one tenth of a percent of the CA*DSD value at the maximum point). Additionally, in order to use the inverse exponential defect size distribution function in (2) for the optimized set of defect sizes, the number of defect sizes is chosen based on the minimum number of data points required for an accurate model of the various distinct regions in the preliminary CA*DSD curve. This number may be determined with an algorithm using various numerical methods, such as a linear approximation comparison with the applied mathematical model such that the percent difference at each data point is less than some threshold.

Then, in operation 420, the optimized set of defect sizes are selected to use as sampling points for the full CA*DSD analysis. These defect sizes are selected using the CA*DSD curve model generated from the preliminary analysis, and may be considered input parameters for the final critical area calculation and the associated determination of theta-bar for the circuit design layer. These input parameters may include an r_minf as the minimum defect size value for the final analysis and an r_maxf as the maximum defect size value for the final analysis. For example, in table 1, the r_minf defect size for layer 1 can be selected as defect size 8, as calculations for defect sizes 1-7 will involve unnecessary measurements. Similarly, for layer 2 the r_minf may be defect size 1 and for layer 3 the r_minf may be defect size 5. Correspondingly, an r_maxf as the maximum final defect size may be defect size x for layer 1, defect size x for layer 2, and defect size x for layer 3, with this defect size maximum selected based on the threshold value for the maximum CA*DSD value against the CA*DSD value at the r_maxf defect size from the prelude analysis in operation 415. The prelude phase may, in some embodiments, improve operation of a device by eliminating such unnecessary measurements for large and small defect sizes (e.g., defect sizes 1-7 and 17 of layer 1) from a final analysis of a circuit design layer.

In addition to the targeted selection of the maximum and minimum defect size values for the final analysis in operation 420, the intermediate defect sizes may also be particularly selected based on the estimated CA*DSD curve from operation 415. For example, particular defect sizes associated with inflection points or large slopes in the CA*DSD curve may be selected, with fewer or no defect sizes in portions of the estimated CA*DSD curve with no inflection point or with a low slope.

In operation 425, the CA values for the selected defect size sample points (e.g., the input parameter discrete points targeted to the r_maxf, the r_minf, and inflection points) are calculated. This essentially can result in a table similar to table 1, but rather than having periodic defect sizes, a set of targeted defect sizes is present with the associated CA values for the targeted defect sizes. These CA values from the full analysis are then used to calculate theta-bar for the circuit design layer. In some embodiments, theta-bar is calculated using Simpson's rule instead of a linear approximation to produce more accurate results for theta-bar due to the nature of the CA*DSD curve as similar to parabolas, which is a feature intrinsic interpolation using Simpson's rule.

In various embodiments, the number of input parameter values (e.g., defect sizes) selected in operation 420 for the full analysis in operation 425 can be based on a target accuracy value. In some experimental embodiments, an accuracy within 1% of a continuous full analysis (e.g., using equation 1) was achieved using 10 input parameter values following a preliminary learning phase, while a similar analysis without a preliminary learning phase and the associated targeted selection of input parameters using 50 input parameter values (e.g., a periodic spread of the defect sizes) resulted in significantly lower accuracy.

After the analysis of the selected layer is completed in operation 425, the system may determine, in operation 430, if additional layer(s) of the circuit design are to be analyzed. As detailed above, a layer being analyzed in accordance with the above description may be a single layer of a circuit, or may be a composite layer of multiple layers from the circuit design. If one or more layers (e.g. single layers or composite layers from the circuit design) remain to be processed, an unprocessed layer is selected in operation 445, and operations 410 through 430 repeat with the newly selected layer. The CAA values (e.g., the theta-bar values for each layer) may then be used as part of the circuit design process validation or update process to either update or finalize the circuit design in operation 435, depending on whether the CAA results meet design parameters. If the theta-bar values for a particular layer do not meet design parameters, updates can be made to the layers of the circuit design targeted to improve CAA results, with an additional iteration of the operations to determine if new CAA values for the updates meet the design parameters. A circuit may be fabricated in operation 440, with the expectation of improved yield due to meeting CAA design targets.

Figure 5A:
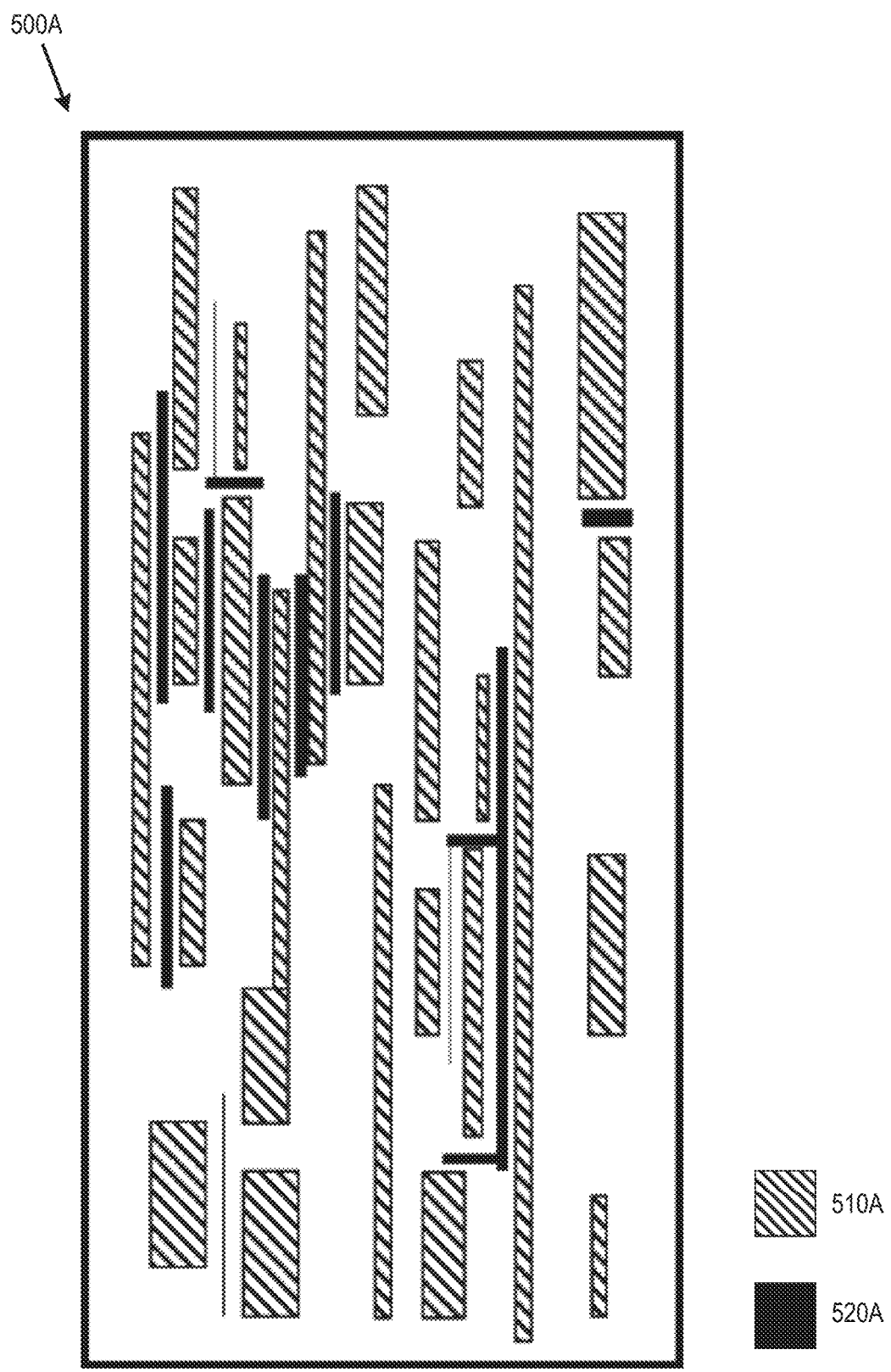
FIGS. 5A-H illustrate aspects of EDA CAA with a learning phase, in accordance with some embodiments.
Figure 5B:
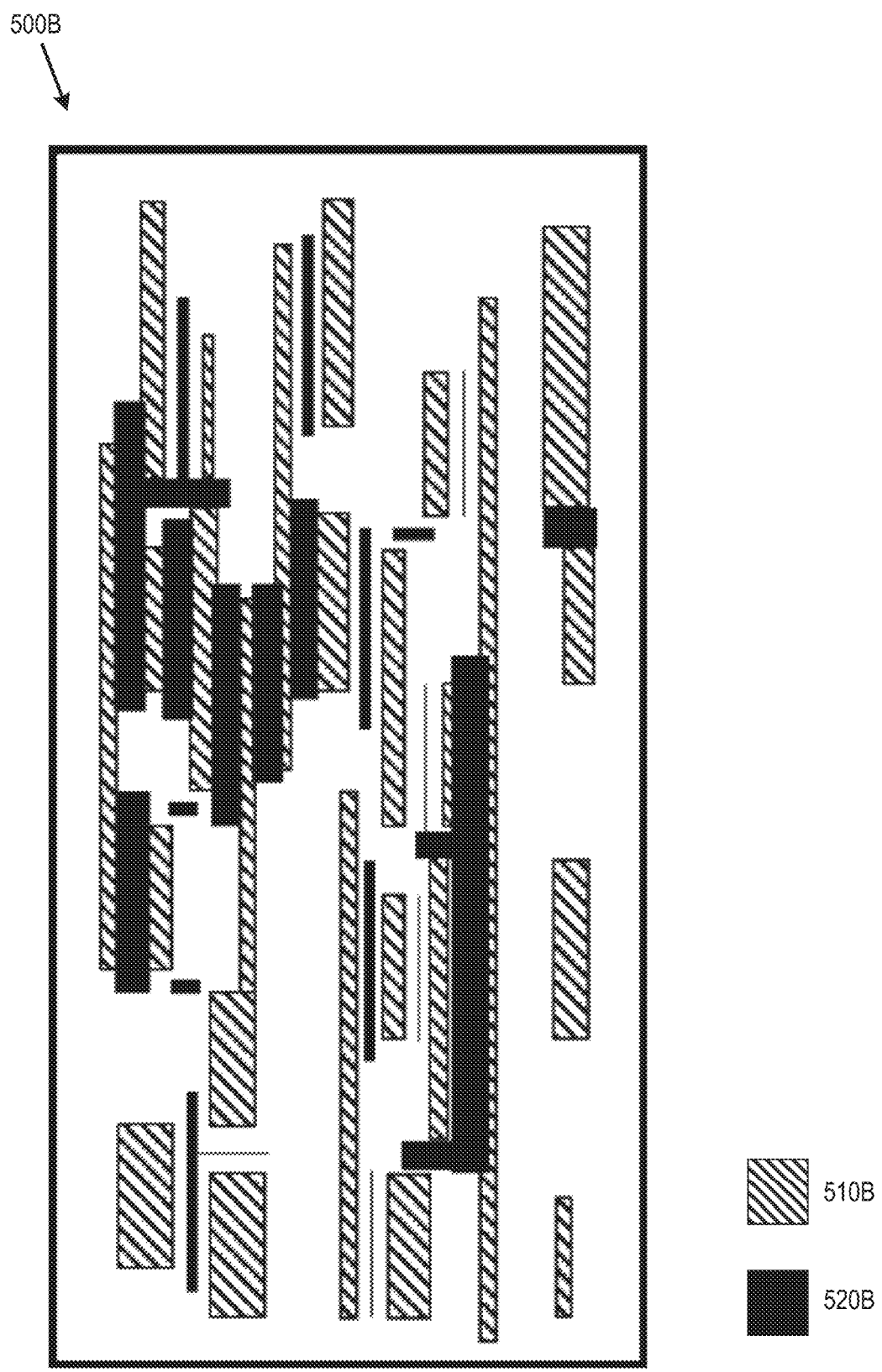
Figure 5C:
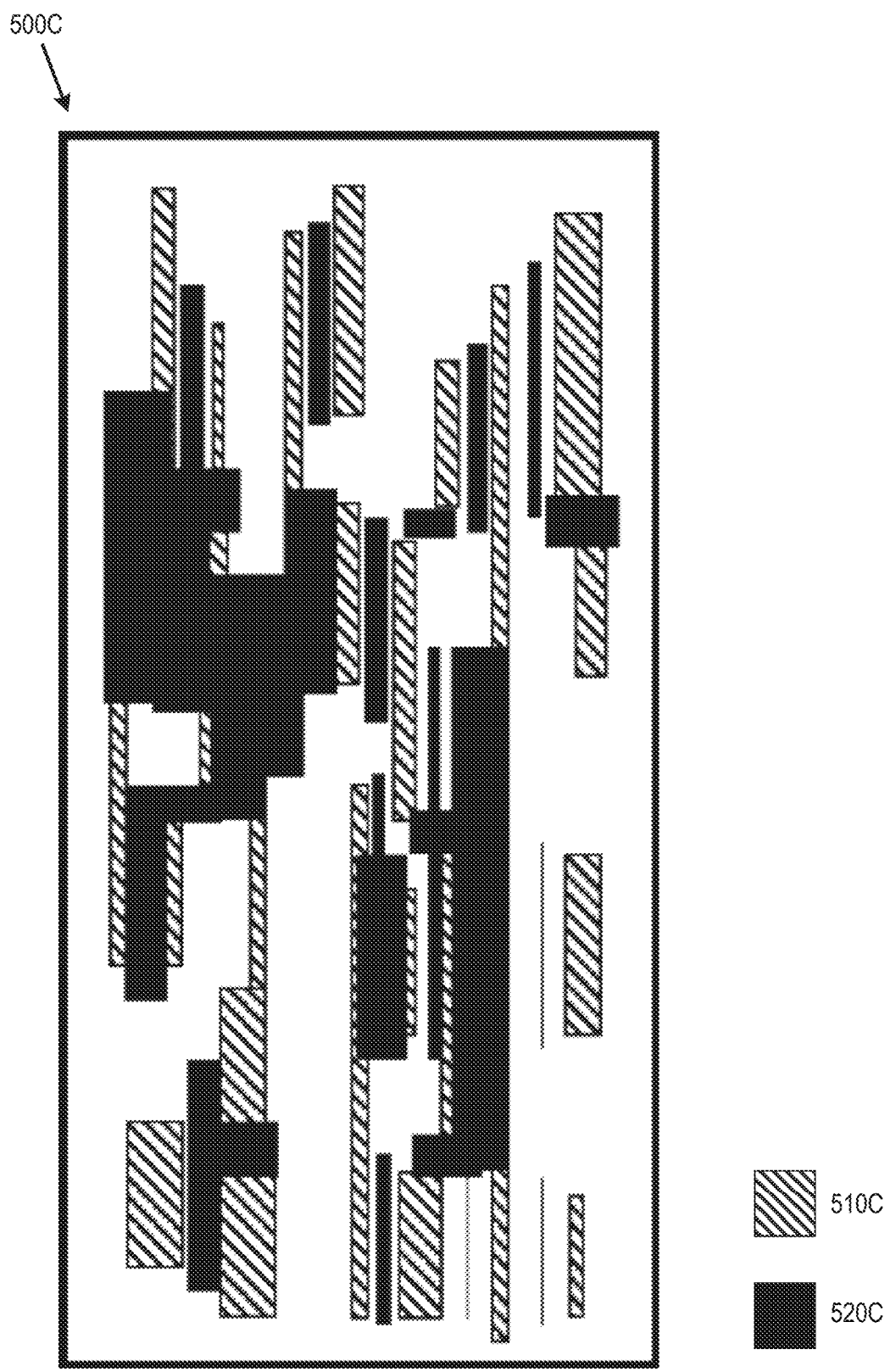
Figure 5D:
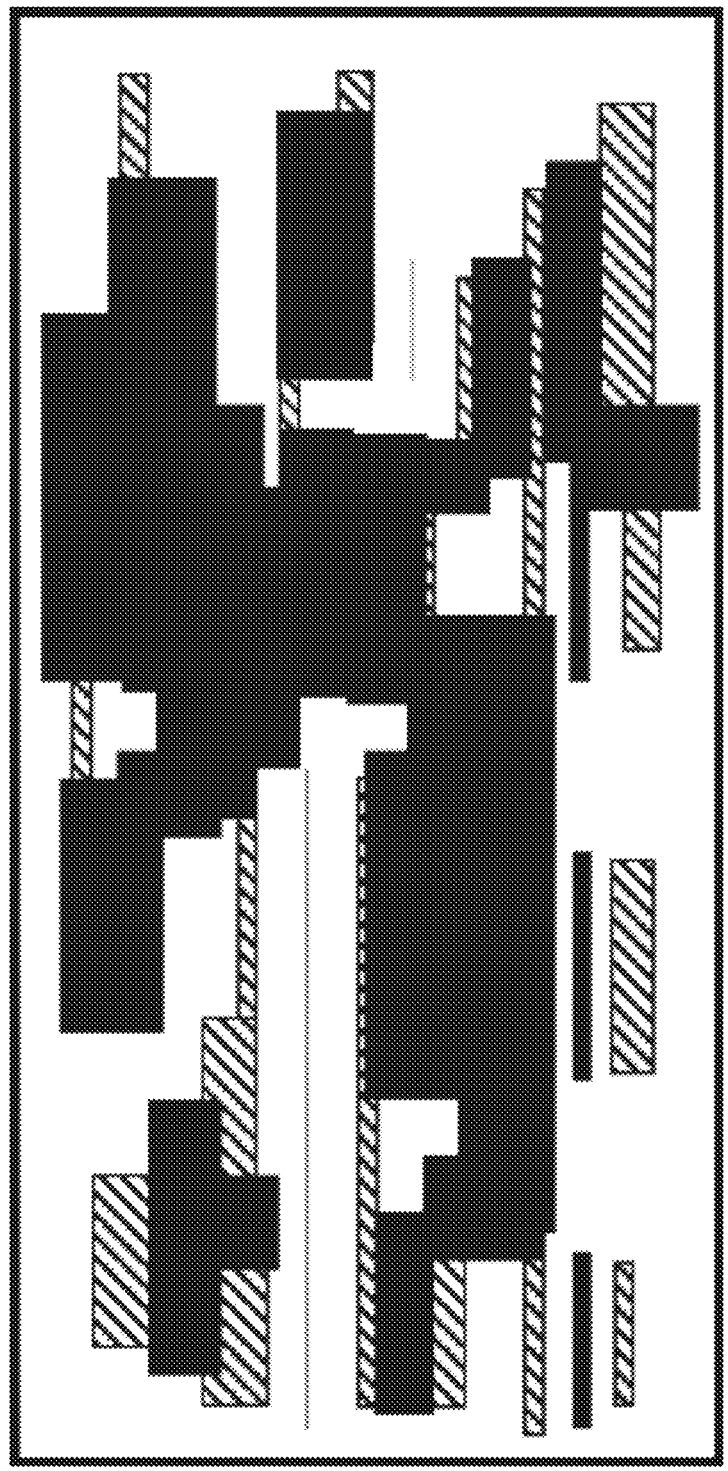
Figure 5E:
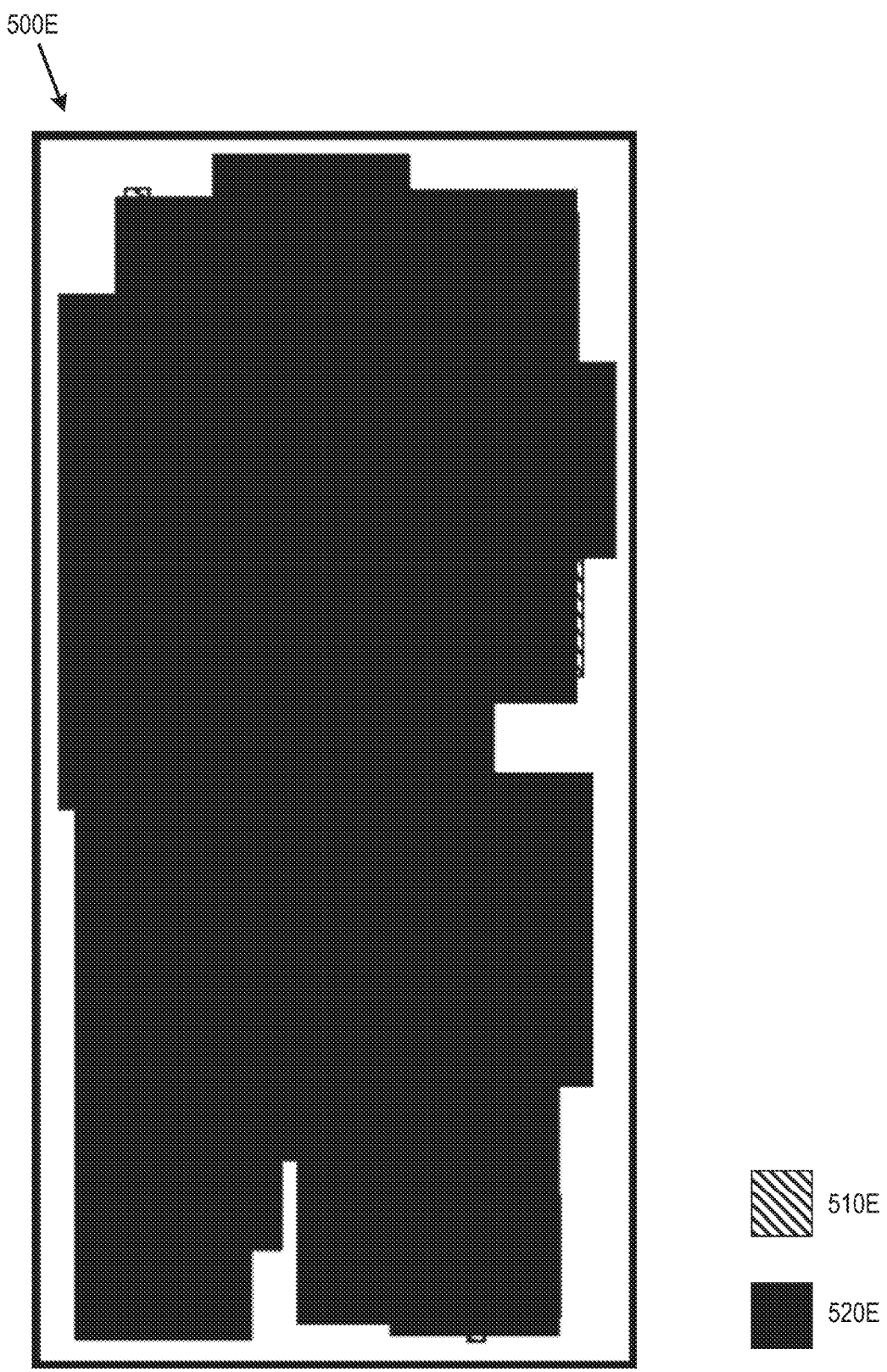

FIGS. 5A-H illustrate aspects of EDA CAA with a learning phase, in accordance with some embodiments. As described above, critical area analysis provides details correlated with probabilistic faults introduced by random defects which occur as part of the process of creating a circuit from a circuit design. The random defects include shorts or opens caused by defects of a certain size interacting with the patterns (e.g., elements which make up a circuit) of the circuit design. FIGS. 5A-5E illustrate a top down view of a circuit design layer 500 with circuit elements 510 and critical areas 520 associated with a particular defect size. FIG. 5A shows illustrated layer 500A with circuit elements 510A and critical area 520A for a first defect size. FIG. 5B shows illustrated layer 500B (e.g., layer 500 with the illustrated critical area) with circuit elements 510B and critical area 520B associated with a defect size larger than the defect size for FIG. 5A. FIGS. 5C, 5D, and 5E similar show versions of layer 500 and the corresponding circuit elements and critical areas as layers 500C, 500D, and 500E; circuit elements 510C, 510D, and 510E; and critical areas 520C, 520D, and 520E associated with increasingly larger defect sizes.

Figure 5F:
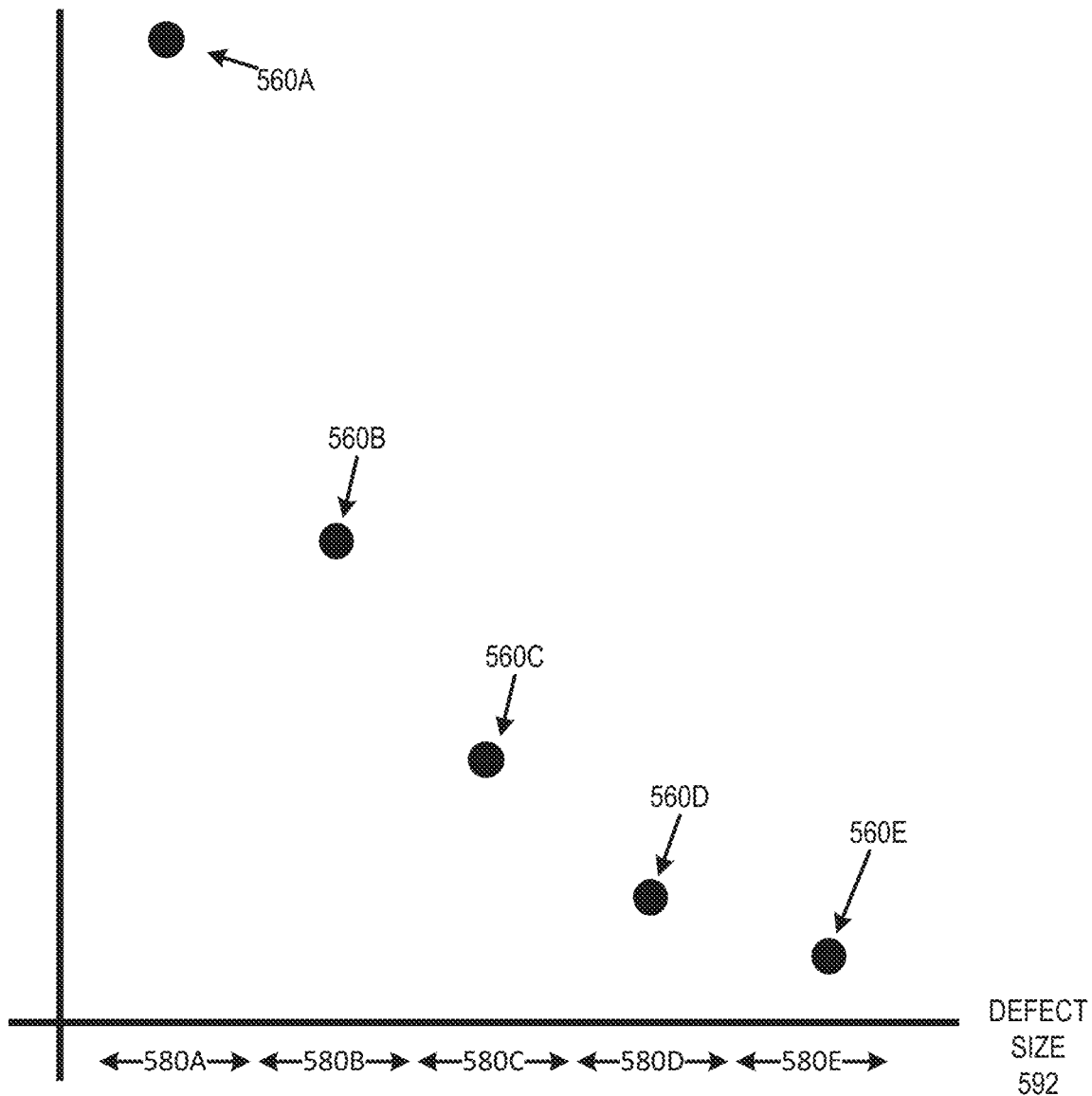

FIG. 5F shows a graph of defect size axis 592 against a number of defects axis 590 for layer 500, showing corresponding coordinates 580A-E (e.g., coordinates of defect size vs. number of defects) for selected defect sizes 580A-E. For a discrete analysis, a single defect size is used to estimate the impacts of a range of defect sizes, as opposed to a continuous analysis which will calculate the effect of all possible defect sizes from zero to infinity. For the discrete analysis, a single defect size essentially represents the impact of similar sized defects in the discrete CAA. Thus, a defect size 580A associated with critical area 520A represents the impact of defects around the size of defect size 580A using the final numerical integration function analysis of the CA*DSD curve. In various embodiments, the numerical integration function analysis may use the trapezoid rule, Simpson's rule, or any other such techniques. Additionally, as illustrated in FIG. 5F, in addition to the previous figures, for smaller defects, even though a larger number of them may be present (e.g., depending on the characteristics of the fabrication process), the actual impact of the smaller defects is a lower corresponding CA due to the smaller size.

Figure 5G:
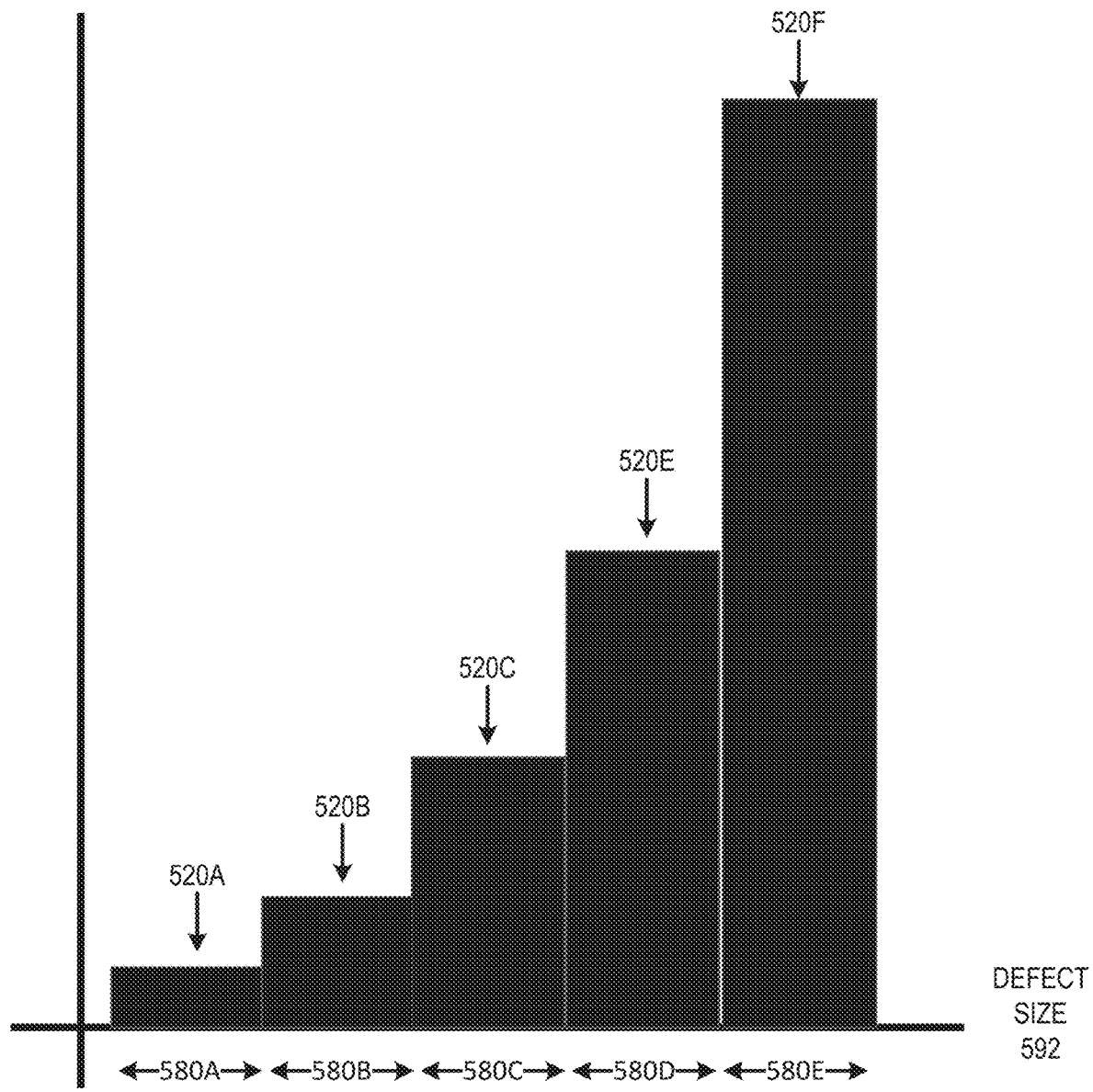

FIG. 5G then shows a chart of the CA 520A-E associated with each defect size 580A-E in a chart of defect size axis 592 against critical area axis 594. As shown by FIGS. 5A-F, while the defect size 580A has a coordinate 560A associated with a larger number of defects, the corresponding CA 520A of FIG. 5A is much smaller due to the smaller size of defect size 580A. By contrast, defect size 580E associated with coordinate 560E has a much larger CA 520A due to the size of defect size 580E.

Figure 5H:
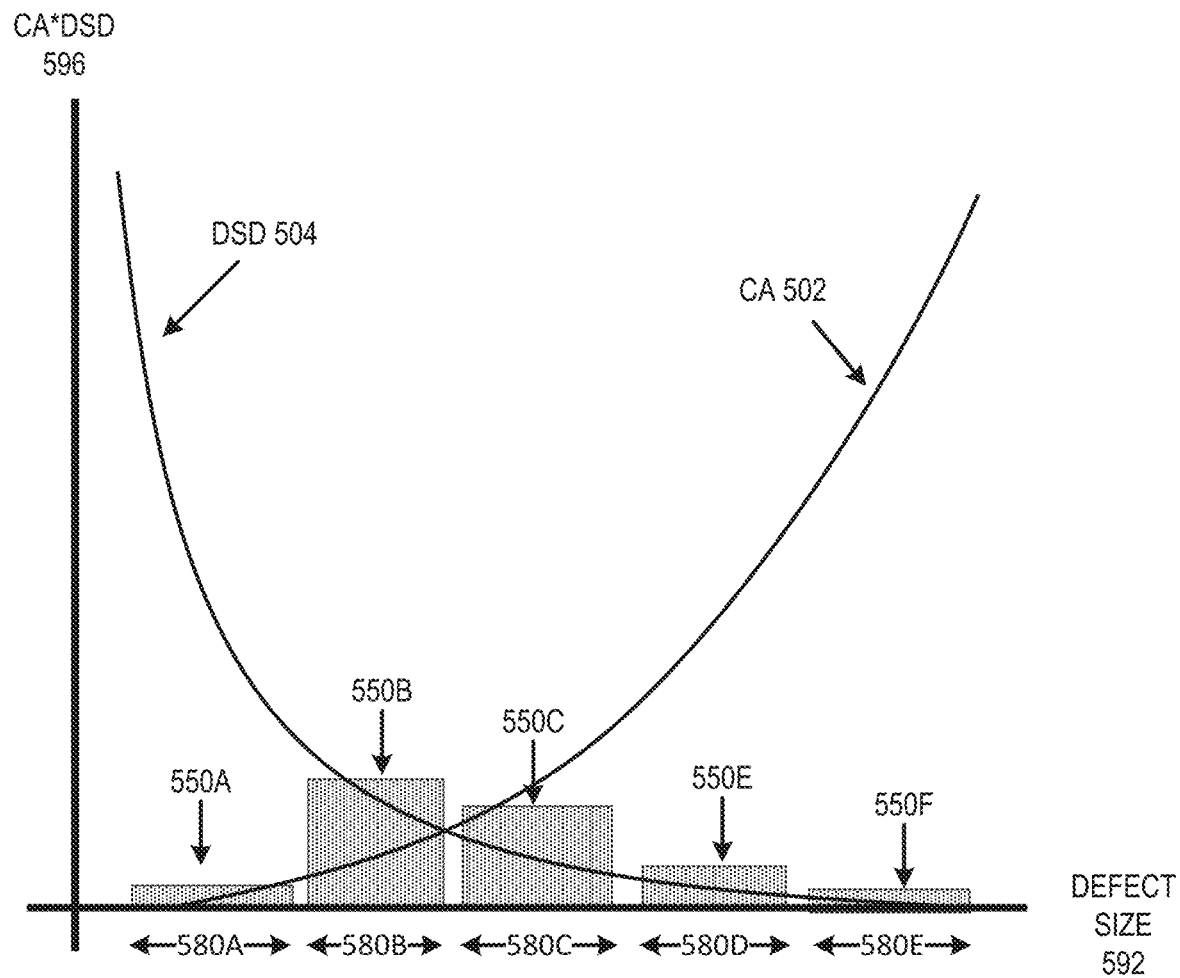

FIG. 5H then shows a discrete illustrate of CA*DSD axis 596 against defect size axis 592, with an estimated defect density (DSD) curve 504 and CA curve 502. The defect density values can be discrete values taken from a modeled curve such as DSD curve 504 or can be provided as a table of data or in any other format. The defect density values can be modeled from the circuit design or taken from a fabrication process data provided to the system. In the example graph, the "width" shown for each defect size 580A-E is shown such that the distances between the various defect sizes are equal, but some systems will use a logarithmic pattern for defect sizes due to an inverse logarithmic model for the defect density. Some systems may use defect sizes selected based on a modeled CA*DSD curve, as detailed above. In some systems, there may be inflection points in the ideal CA*DSD curve, since the CA for certain defect sizes looks like a step function when a defect of a certain size interacts with a design with certain features and this may result in impacts on defect size selection. The spacing of the defect size values 580A-E and the CA*DSD values 550A-F when viewed together representing the volume of the area under the CA and DSD curves is not representative of many systems. Instead, the actual systems will have nonlinear results which are apparent from FIG. 5H and the discussion above. In an actual theta-bar calculation as part of the full CAA, the CA*DSD values 550A-F would be used with a linear analysis or a numerical integration function such as Simpson's rule or the trapezoid rule to calculate theta-bar using the defect size values 580A-E and CA*DSD values 550A-F.

Figure 6:
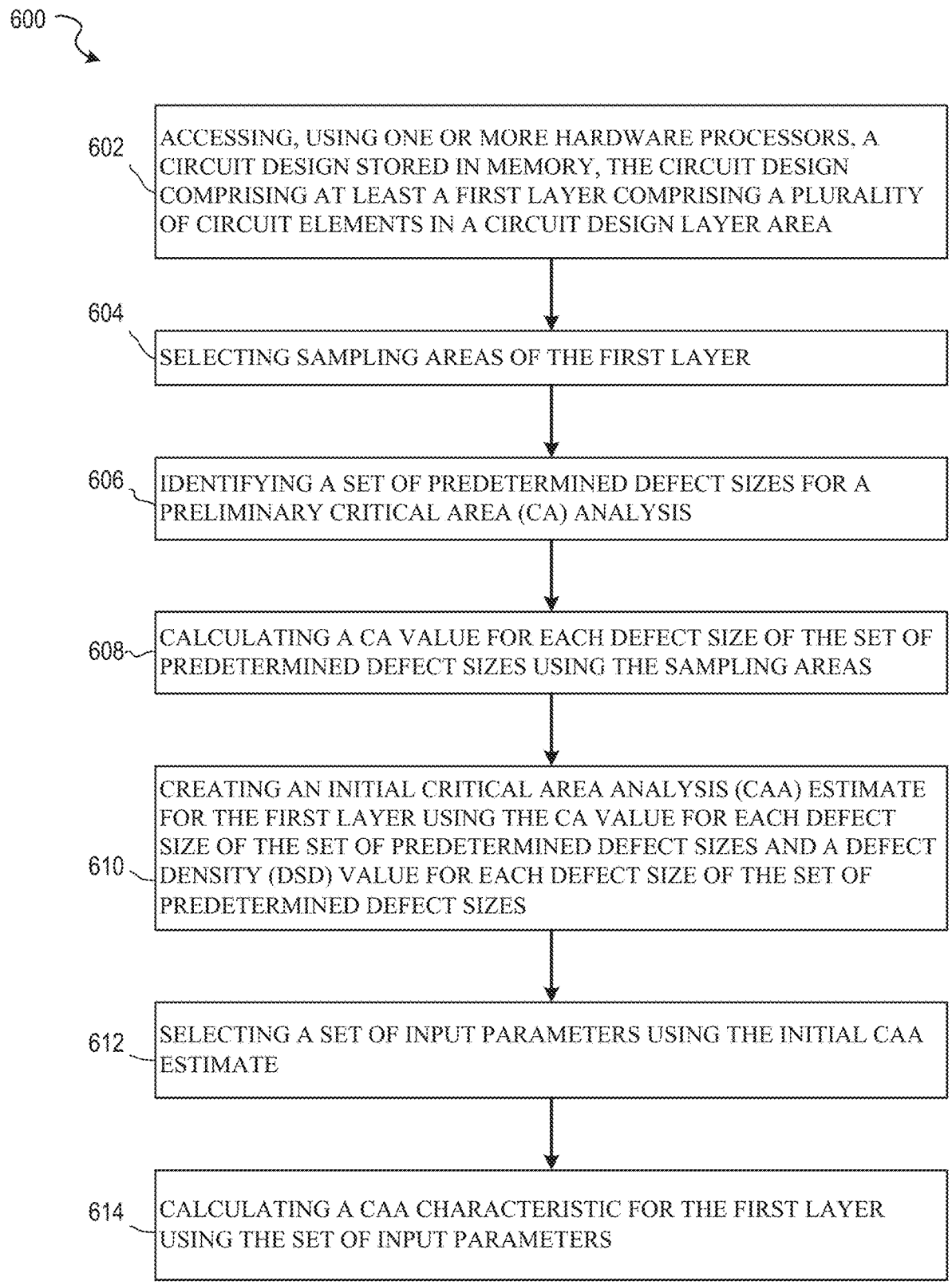
FIG. 6 illustrates a method for CAA, in accordance with some embodiments.

FIG. 6 illustrates a method 600 for CAA, in accordance with some embodiments. In some embodiments, the method 600 is performed by an EDA computing device with one or more processors, which may be configured for additional EDA operations as part of a circuit design process involving CAA and possibly additional operations from a circuit design process as illustrated in FIG. 1. In some embodiments, CAA is performed using a CAA focused application such as application 710 operating on a machine 800. In some embodiments, the method 600 is embodied in computer-readable instructions stored in a non-transitory storage device, such as memory 730, such that when the instructions are executed by one or more processors of a device, the device performs the method 600.

Method 600 begins with operation 602 involving accessing, using one or more hardware processors, a circuit design stored in memory. The circuit design can be provided in response to a user input or as part of a larger automated process. The circuit design includes at least a first layer comprising a plurality of circuit elements in a circuit design layer area and can include any number of layers, with the described method repeated for any or all of the layers to determine a critical area characteristic for each layer. The circuit design can be data in any format that includes sufficient information to determine how defects of different sizes will interact with the particular elements of the design in the described layout.

The sampling areas of the first layer are selected in operation 604. This selection of sampling areas can involve segmenting the circuit design layer area using a grid pattern and selecting a sampling percentage of each section of the grid pattern as the sampling areas of the first layer. Other embodiments involve randomizing the sampling areas of the first layer using a target percentage area of the circuit design layer area to select the sampling areas. In still further embodiments, other methods of selecting the sampling area may be used. In general, the sampling area is a small subset of the layer in order to reduce the processing resources used in the preliminary analysis. Use of most or all of the layer during this phase would limit the benefits of the described operations, which are targeted to reduce the overall device resources used to calculate the CAA characteristics with reasonable similarity to a full continuous analysis or intensively sampled discrete analysis (e.g., within 1%). As described above, in some embodiments, the sampled area can be approximately one percent of the total area of the layer. In other embodiments, other such percentages can be used, as long as reasonable accuracy is expected based on the particular details of the circuit design layer.

Operation 606 then involves identifying a set of predetermined defect sizes for a preliminary CAA. A CA value for each defect size of the set of predetermined defect sizes using the sampling areas is calculated in operation 608. Operation 610 involves creating an initial CAA estimate for the first layer using the CA value for each defect size of the set of predetermined defect sizes and a DSD value for each defect size of the set of predetermined defect sizes. In some embodiments, the DSD value for each defect size of the set of predetermined defect sizes is determined from fabrication process data for a fabrication process used to fabricate integrated circuits associated with the circuit design. In other embodiments, this can be modeled, provided by a system user, or selected from a set of expected fabrication process characteristics.

In some systems, the initial CAA estimate for the first layer is created by determining a maximum CA*DSD value associated with the set of preliminary defect sizes and an associated defect size for the maximum CA*DSD value. A CA*DSD curve for defect sizes less than the associated defect size is modeled using a second order polynomial with a minimum defect size selected to avoid redundant calculations. The CA*DSD curve for defect sizes greater than the associated defect size is modeled using an inverse exponential. A maximum defect size is selected as associated with a maximum defect size CA*DSD value which is less than a target percentage of the maximum CA*DSD value. For example, in one embodiment, the target percentage is one tenth of one percent, such that a ratio of the maximum defect size CA*DSD value to the maximum CA_DSD value is less than 0.001 maximum defect size with a threshold fractional value. In other embodiments, other such operations or models may be used. In some embodiments, a table of defect sizes and CA values for the defect sizes may be used, as illustrated in table 1, with intermediate points interpolated or otherwise modeled using any acceptable process for characterizing a CA*DSD curve.

Operation 612 involves selecting a set of input parameters using the initial CAA estimate. In various embodiments, the set of input parameters are a set of defect sizes. This set of defect sizes includes at least a minimum defect size and a maximum defect size. The preliminary minimum defect size of the set of predetermined defect sizes is smaller than the minimum defect size of the set of input parameters. In other words, as described above, the set of defect sizes is selected to cull certain defect sizes from the preliminary set of defect sizes to eliminate calculations which provide very little or no contribution to the final CAA characteristic, as described above with respect to table 1. Additional parameters of the set of input parameters can be selected in various ways. Some parameters can be a selected defect size corresponding to an inflection point identified using the initial CAA estimate. Other parameters may be associated with steep slope areas of the CA*DSD curve or to provide additional points for a Simpson's rule set of calculations.

A CAA characteristic for the first layer using the set of input parameters is then calculated in operation 614. In some embodiments, this calculating of the CAA characteristic for the first layer using the set of input parameters includes calculating a corresponding CA value for each defect size of the set of defect sizes and calculating a corresponding DSD value for said each defect size of the set of defect sizes. A theta-bar value using the corresponding CA value for each defect size of the set of defect sizes, the corresponding DSD value for said each defect size of the set of defect sizes, and Simpson's rule is part of some such operations. This can include calculations according to equation 1 above where CA(x) is the corresponding CA value for a corresponding defect size x of the set of defect sizes from r_min to r_max, DSD(x) is a defect density for the corresponding defect size x of the set of defect sizes from r_min to r_max, and the Area is an area value of the circuit design layer area.

If the CAA characteristic does not meet design expectations, additional revisions may occur for the circuit design, with subsequent iterations of the above operations for the new design. After a design is finalized, a physical integrated circuit device can be fabricated from the circuit design. In various embodiments, various devices, systems, and methods are used to fabricate devices based on the circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD), or any such similar processes. Some embodiments may use files generated according to operations described herein for chemical mechanical polishing, where a chemical slurry with etchant agents is used to planarize the wafer surface; for oxidation, where dry oxidation or wet oxidation molecules convert silicon layers on top of the wafer to silicon dioxide; for ion implantation, where dopant impurities are introduced into a semiconductor using a patterned electrical field; or for diffusion, where bombardment-induced lattice defects are annealed. Thus, in various embodiments, systems and operations include not only computing devices for generating updated circuit design files, but also hardware systems for fabricating masks and controlling integrated circuit (IC) fabrication hardware, and the hardware and operations for fabricating a circuit from a circuit design generated in accordance with various embodiments described herein. Following such operations to fabricate a circuit, the circuit may be connected to tester machines which validate the failure rates associated with the calculated CAA characteristics.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 7:
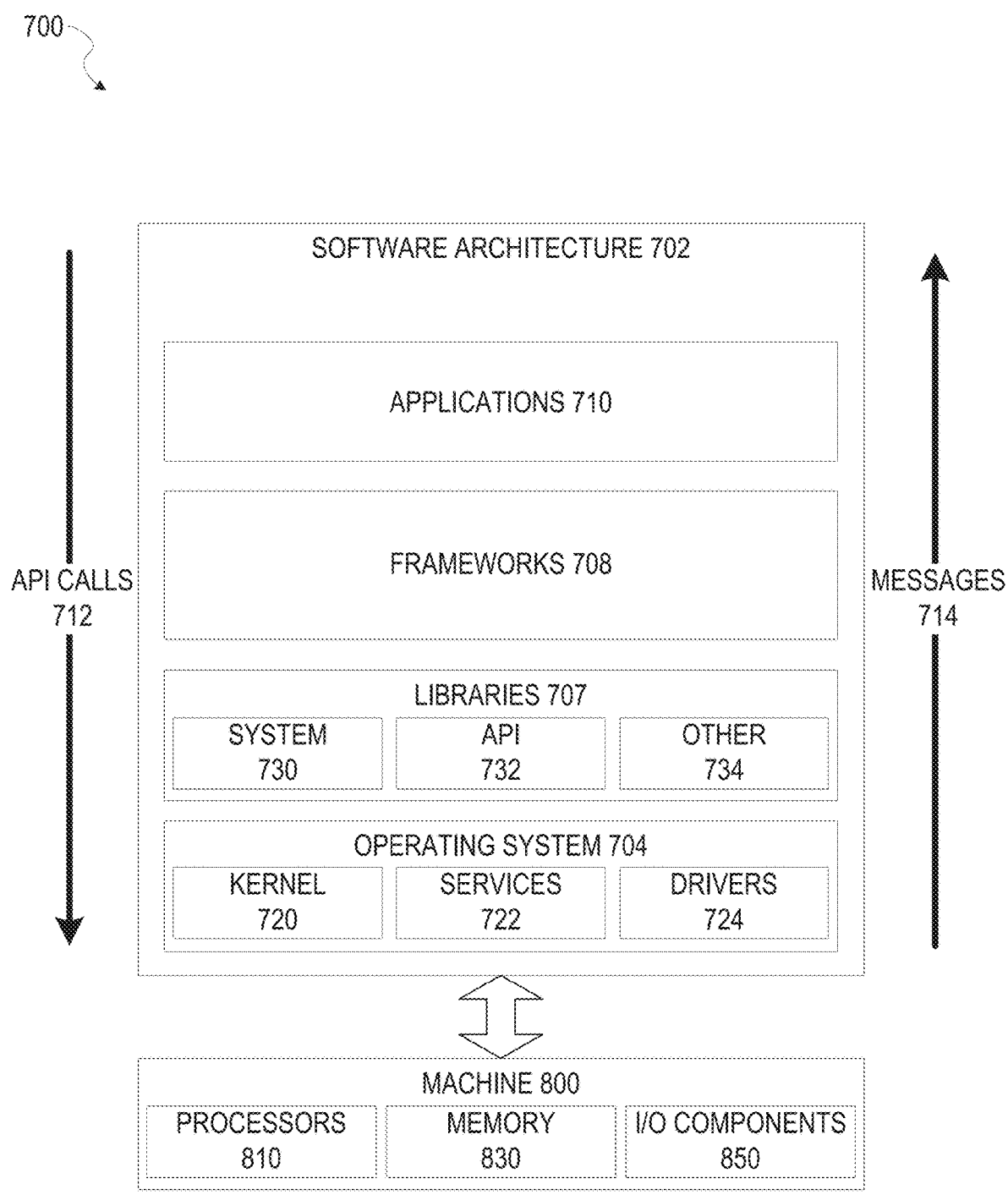
FIG. 7 is a block diagram illustrating an example of a software architecture that may be operating on an EDA computer and used with methods for CAA and associated generation of circuits from circuit designs according to some example embodiments.

FIG. 7 is a block diagram 700 illustrating an example of a software architecture 702 that may be operating on any machine described herein and associated with CAA of a circuit design. The software architecture 702 can be used with a pattern migration tool, a tester machine, or any electronic design automation computing device to implement any of the methods described above. Aspects of the software architecture 702 may, in various embodiments, be used to store circuit designs, test patterns, or any other such information in association with generation and testing of a circuit design and physical devices generated using these circuit designs.

FIG. 7 is merely a non-limiting example of a software architecture 702, and it will be appreciated that many other architectures can be implemented to facilitate the functionality described herein. In various embodiments, the software architecture 702 is implemented by hardware such as a machine 800 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 707, software frameworks 708, and applications 710. Operationally, the applications 710 invoke application programming interface (API) calls 712 through the software stack and receive messages 714 in response to the API calls 712, consistent with some embodiments. In various embodiments, any client device, server computer of a server system, or any other device described herein may operate using elements of the software architecture 702. An EDA computing device described herein may additionally be implemented using aspects of the software architecture 702, with the software architecture 702 adapted for CAA of a circuit design in accordance with embodiments described herein.

In one embodiment, an EDA application of the applications 710 performs operations described herein for CAA of a circuit design using various modules within the software architecture 702. For example, in one embodiment, an EDA computing device similar to the machine 800 includes the memory 830 and the one or more processors 810.

In various other embodiments, rather than being implemented as modules of one or more applications 710, some or all of the modules used for CAA can be implemented using elements of the libraries 706 or operating system 704.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730, such as libraries of multi-instance blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic context on a display), database libraries (e.g., SQLite to provide various relational database functions), web libraries (e.g., WebKit to provide web browsing functionality), and the like. The libraries 706 may also include other libraries 734.

The software frameworks 708 provide a high-level common infrastructure that can be utilized by the applications 710, according to some embodiments. For example, the software frameworks 708 provide various graphic user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA design environment to implement analysis described herein. This includes analysis of input design files for an integrated circuit design, IP blocks and associated test patterns, functional information for implementing pattern migration from IP blocks to a system on a chip (SOC) or application-specific integrated circuit (ASIC) design boundary, or any other such information that may be used as part of or along with the embodiments described herein. While netlist files, library files, SDC files, and viewdefinition files are examples that may operate within the software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA), an SOC, or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instant of time and to constitute a different hardware module at a different instant of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 800, but deployed across a number of machines 800. In some example embodiments, the processors 810 or processor-implemented modules are located in a single geographic location (e.g., within a home environment, an office environment, or a server farm). In other example embodiments, the processors 810 or processor-implemented modules are distributed across a number of geographic locations.

Figure 8:
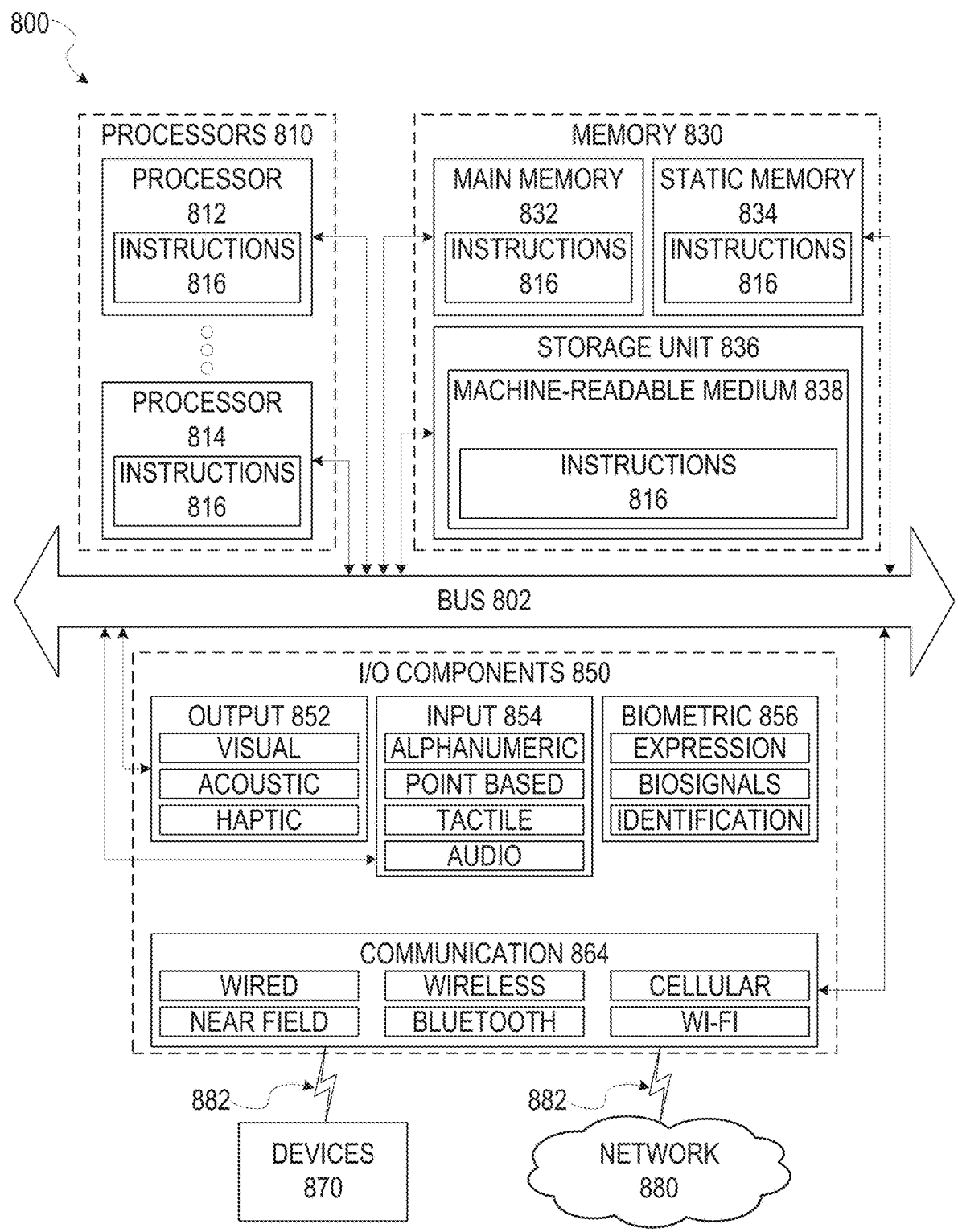
FIG. 8 is a block diagram illustrating an example machine that may implement various embodiments described herein.

FIG. 8 is a diagrammatic representation of the machine 800 in the form of a computer system within which a set of instructions may be executed for causing the machine 800 to perform any one or more of the methodologies discussed herein, according to an example embodiment. FIG. 8 shows components of the machine 800, which is, according to some embodiments, able to read instructions from a machine-readable medium (e.g., a machine-readable storage medium) and perform any one or more of the methodologies discussed herein. In some embodiments, the machine 800 may operate with instructions 816 (e.g., software, a program, an application, an applet, an app, or other executable code) for causing the machine 800 to perform any one or more of the methodologies discussed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions 816, when executed by one or more processors of the machine 800 (e.g., the processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the/O components 850 include output components 852 and input components 854. The output components 852 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein. Embodiments described herein then optimize and improve the operation of a device such as the machine 800 in implementing EDA operations by improving resource usage of the machine 800 or another associated machine as part of design, fabrication, and testing of a circuit device.

Communication can be implemented using a wide variety of technologies. The I/O components 850 may include communication components 864 operable to couple the machine 800 to a network 880 or devices 870 via couplings 882. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a USB).

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method comprising:
   accessing, using one or more hardware processors, a circuit design stored in memory, the circuit design comprising at least a first layer comprising a plurality of circuit elements in a circuit design layer area;
selecting sampling areas of the first layer;
identifying a set of predetermined defect sizes for a preliminary critical area analysis (CAA);
calculating, using the one or more hardware processors, a critical area (CA) value for each defect size of the set of predetermined defect sizes using the sampling areas;
creating, using the one or more hardware processors, an initial CAA estimate for the first layer using the CA value for each defect size of the set of predetermined defect sizes and a defect density (DSD) value for each defect size of the set of predetermined defect sizes;
selecting a set of input parameters using the initial CAA estimate, the set of input parameters comprising a selected defect size that corresponds to an inflection point, and the inflection point being identified using initial CAA estimate; and
calculating, using the one or more hardware processors, a CAA characteristic for the first layer using the set of input parameters.

2. The computerized method of claim 1, wherein the set of input parameters comprises a set of defect sizes, the set of defect sizes comprising a minimum defect size and a maximum defect size; and
wherein a preliminary minimum defect size of the set of predetermined defect sizes is smaller than the minimum defect size of the set of input parameters.

3. The computerized method of claim 2, wherein the calculating the CAA characteristic for the first layer using the set of input parameters comprises calculating a corresponding CA value for each defect size of the set of defect sizes and calculating a corresponding DSD value for each defect size of the set of defect sizes.

4. The computerized method of claim 3, wherein the calculating the CAA characteristic for the first layer using the set of input parameters further comprises calculating a theta-bar value using the corresponding CA value for each defect size of the set of defect sizes, the corresponding DSD value for each defect size of the set of defect sizes, and a numerical integration function.

5. The computerized method of claim 4, wherein the theta-bar value is calculated according to:

$$\overline{\theta} = \frac{\int_{r\_min}^{r\_max} CA(x)DSD(x)dx}{Area}$$

where CA(x) is the corresponding CA value for a corresponding defect size x of the set of defect sizes from r_min to r_max;
where DSD(x) is a defect density for the corresponding defect size x of the set of defect sizes from r_min to r_max; and
where Area is an area value of the circuit design layer area.

6. The computerized method of claim 1, wherein the selecting sampling areas of the first layer comprises:
segmenting the circuit design layer area using a grid pattern; and
selecting a sampling percentage of each section of the grid pattern as the sampling areas of the first layer.

7. The computerized method of claim 1, wherein the selecting sampling areas of the first layer comprises randomizing the sampling areas of the first layer using a target percentage area of the circuit design layer area.

8. The computerized method of claim 1, wherein the selecting the set of input parameters using the initial CAA estimate comprises:
automatically analyzing a preliminary CA*DSD curve from the initial CAA estimate to determine characteristics of the preliminary CA*DSD curve;
automatically selecting one or more models based on the characteristics of the preliminary CA*DSD curve;
automatically calculating coefficients for the one or more models using data points of the preliminary CA*DSD curve;
fitting the one or more models using the coefficients to a data range to generate the initial CAA estimate; and
selecting the set of input parameters based on at least two distinct regions in the preliminary CA*DSD curve which are separated by a maximum value in the initial CAA estimate.

9. The computerized method of claim 1, wherein the creating the initial CAA estimate for the first layer comprises:
determining a maximum CA*DSD value associated with the set of preliminary defect sizes, and an associated defect size for the maximum CA*DSD value.

10. The computerized method of claim 9, wherein the creating the initial CAA estimate for the first layer further comprises:
modeling a CA*DSD curve for defect sizes less than the associated defect size using a second order polynomial with a minimum defect size selected to avoid redundant calculations.

11. The computerized method of claim 10, wherein the creating the initial CAA estimate for the first layer further comprises:
modeling the CA*DSD curve for defect sizes greater than the associated defect size using an inverse exponential.

12. The computerized method of claim 11, wherein a maximum defect size is selected as associated with a maximum defect size CA*DSD value which is less than a target percentage of the maximum CA*DSD value.

13. The computerized method of claim 12, wherein the target percentage is 0.1 percent such that a ratio of the maximum defect size CA*DSD value to the maximum CA*DSD value is less than 0.001 maximum defect size with a threshold fractional value.

14. The computerized method of claim 1, wherein the DSD value for each defect size of the set of predetermined defect sizes is determined from fabrication process data for a fabrication process used to fabricate integrated circuits associated with the circuit design.

15. The computerized method of claim 1 further comprising:
generating an updated circuit design based on the CAA characteristic of the first layer; and
initiating fabrication of a circuit using the updated circuit design.

16. A device comprising:
a memory device; and
one or more processors coupled to the memory device and configured to perform operations comprising:
accessing, using the one or more processors, a circuit design stored in memory, the circuit design comprising at least a first layer comprising a plurality of circuit elements in a circuit design layer area;

selecting sampling areas of the first layer comprising a sampling area that is less than a threshold percentage of a total area of the circuit design layer area;

calculating, using the one or more processors, a critical area (CA) value for each defect size of a set of predetermined defect sizes using the sampling areas;

creating an initial critical area analysis (CAA) estimate for the first layer using the CA value for each defect size of the set of predetermined defect sizes and a defect density (DSD) value for each defect size of the set of predetermined defect sizes;

selecting a set of defect sizes using the initial CAA estimate; and calculating, using the one or more processors, a CAA characteristic for the first layer using the set of defect sizes selected using the initial CAA estimate, the calculating the CAA characteristic comprising:

calculating a corresponding CA value for each defect size of the set of defect sizes; and calculating a corresponding DSD value for each defect size of the set of defect sizes.

17. The device of claim 16, wherein the set of defect sizes comprising a minimum defect size and a maximum defect size; and wherein a preliminary minimum defect size of the set of predetermined defect sizes is smaller than the minimum defect size.

18. A non-transitory computer-readable medium comprising instructions that, when executed by one or more processors of a device, cause the device to perform operations comprising:

accessing a circuit design stored in memory, the circuit design comprising at least a first layer comprising a plurality of circuit elements in a circuit design layer area;

calculating a critical area (CA) value for each defect size of set of predetermined defect sizes using sampling areas selected from the circuit design layer area;

creating an initial critical area analysis (CAA) estimate for the first layer using the CA value for each defect size of the set of predetermined defect sizes and a defect density (DSD) value for each defect size of the set of predetermined defect sizes;

automatically analyzing a preliminary CA*DSD curve from the initial CAA estimate to determine characteristics of the preliminary CA*DSD curve;

automatically selecting one or more models based on the characteristics of the preliminary CA*DSD curve;

automatically calculating coefficients for the one or more models using data points of the preliminary CA*DSD curve;

fitting the one or more models using the coefficients to a data range to generate the initial CAA estimate;

selecting a set of defect sizes using the one or more models and the data range; and calculating a CAA characteristic for the first layer using the set of defect sizes, the calculating the CAA characteristic for the first layer using the set of defect sizes comprising:

calculating a theta-bar value using a corresponding CA value for each defect size of the set of defect sizes; and calculating a corresponding DSD value for each defect size of the set of defect sizes.

19. The non-transitory computer-readable medium of claim 18, wherein the theta-bar value is calculated according to:

$$\bar{\theta} = \frac{\int_{rmin}^{rmax} CA(x)DSD(x)dx}{Area}$$

where CA(x) is the corresponding CA value for a corresponding defect size x of the set of defect sizes from r_min to r_max;

where DSD(x) is a defect density for the corresponding defect size x of the set of defect sizes from r_min to r_max; and where Area is an area value of the circuit design layer area.

* * * * *